United States Patent [19]
Kim

[11] Patent Number: 6,049,059
[45] Date of Patent: Apr. 11, 2000

[54] VISION PROCESSING METHOD AND DEVICE FOR WELDING LINE AUTO-TRACKING

[75] Inventor: Jae-Sun Kim, Yongin, Rep. of Korea

[73] Assignee: Samsung Electronics Co., Ltd., Suwon, Rep. of Korea

[21] Appl. No.: 08/972,438

[22] Filed: Nov. 18, 1997

[30] Foreign Application Priority Data

Nov. 18, 1996 [KR] Rep. of Korea ...................... 96-54990

[51] Int. Cl.[7] ................................................ B23K 9/127
[52] U.S. Cl. ...................................... 219/124.34; 382/151
[58] Field of Search ...................... 219/130.01, 124.34, 219/130.21; 382/151, 203

[56] References Cited

U.S. PATENT DOCUMENTS 4,652,133  3/1987  Antoszewski et al. ............ 219/124.34
4,812,614  3/1989  Wang et al. ......................... 219/124.34
5,264,678  11/1993  Powell et al. ....................... 219/130.01
5,862,245  1/1999  Renouard et al. ....................... 382/203

*Primary Examiner*—Clifford C. Shaw
*Attorney, Agent, or Firm*—Staas & Halsey LLP

[57] ABSTRACT

A vision processing method and device which processes a photographed-object image to provide information about a position and shape of the object, and perform the steps of forming a shape-memory contour model having a tendency to mention its original shape, the model being capable of changing its shape and position by an exterior operation; giving an outline of the shape-memory elastic contour model on the basis of an image of a photographed object; displacing the outlined contour model to an area expected to be occupied by the image of the photographed object; modifying the shape-memory elastic contour model in response to an exterior force generated in the image of the photographed object; and determining an image coordinate of the photographed object on the basis of the modified model.

20 Claims, 4 Drawing Sheets

VISION PROCESSING METHOD AND DEVICE FOR WELDING LINE AUTO-TRACKING

BACKGROUND OF THE INVENTION

1. Field of the Invention

The present invention relates to a vision processing method and device for automatically tracking welding lines in an arc welding process, and more particularly, to a welding line vision processing method and device for obtaining information about a position and shape of a welding line, which is transmitted to a control unit of a welding torch, so that the welding torch can automatically track the welding line in an arc welding process through a robot.

2. Description of the Related Art

Generally, an automatic arc welding process requires a user to photograph a shape of a welding line by utilizing a laser beam, and to process data about its shape through a computer to gather the information about the position and shape of the welding line, thereby providing for a control of movement of a welding torch by utilizing the position and shape information.

A conventional technique processing the shape of the welding line, as shown in FIGS. 1A through 1C, includes three steps being performed in consecutive order. That is to say, FIG. 1A shows data obtained by observing, with a CCD (camcorder) camera, bands of the laser beams projected onto a front part of the torch, FIG. 1B shows central coordinates of the laser bands obtained by a result of FIG. 1A, and FIG. 1C shows intersecting points between the lines formed by the central coordinates. Positions of joining parts of an object are determined through information obtained from the intersecting points as shown in FIG. 1C.

The image of the laser band, as shown in FIG. 1A, is obtained by photographing with a camcorder the laser band projected on the front part of the torch during the welding process. The central coordinates of the laser bands in FIG. 1B include points indicating the maximum output on the image of the laser bands. The points are obtained by a laser band detecting filter which has a weighted value of a distribution shown in FIG. 2. That is, the two-dimensional image data, as shown in FIG. 1A, is changed to data such as that in FIG. 1B by the laser band detecting filter.

At this time, the weighted value of the laser band detecting filter should be designed to be zero in its total, and the filter effectively responds in its function when a clear band having an even thickness is formed horizontally on its image. The position of the welding joint and its shape are determined in response to the result obtained by fitting a plurality of lines, as shown in FIG. 1C, thereby controlling the welding torch to process the arc welding on the basis of such data.

However, there is a problem in the conventional method thus performed in that it is difficult to utilize this method in an arc welding process in which a high voltage is needed, as the results are badly affected by welding noises such as an arc light or spattering caused by the welding.

SUMMARY OF THE INVENTION

Accordingly, it is an object of the present invention to solve the aforementioned problem and it is another object of the present invention to provide a vision processing method for automatically tracking a welding line to overcome noises caused by a welding light, spattering and the like.

Additional objects and advantages of the invention will be set forth in part in the description which follows and, in part, will be obvious from the description, or may be learned by practice of the invention.

In accordance with the above and other objects of the present invention, there is provided a vision processing method which processes a photographed-object image to provide information about a position and a shape of the object, including the steps of: forming a shape memory contour model having a tendency to maintain its original shape, the model being capable of changing its shape and position by an exterior operation; giving an outline of the shape memory elastic contour model on the basis of an object image which has been photographed; displacing the contour model to an area to be expected to be occupied by the image of the photographed object; modifying the shape memory elastic contour model in response to a change generated in the photographed-object image; and determining an image coordinate of the photographed object on the basis of the modified model.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1A:
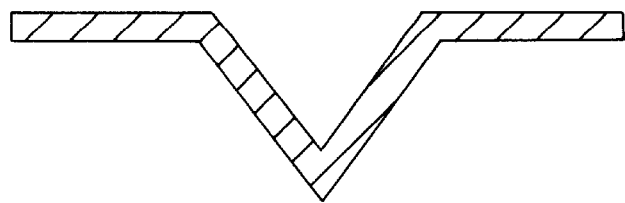
FIG. 1A shows data obtained by observing bands of laser beams projected onto a front part of a torch according to a conventional method.
Figure 1B:
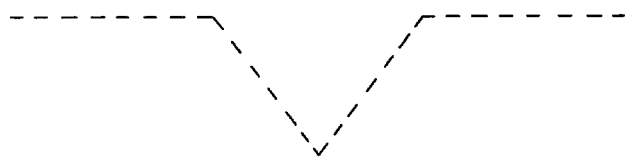
FIG. 1B shows central coordinates of laser bands obtained by the results shown in FIG. 1A.
Figure 1C:
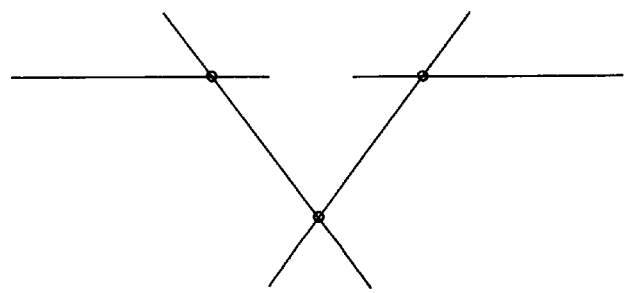
FIG. 1C shows intersecting points between lines formed by the central coordinates according to the conventional method.
Figure 2:
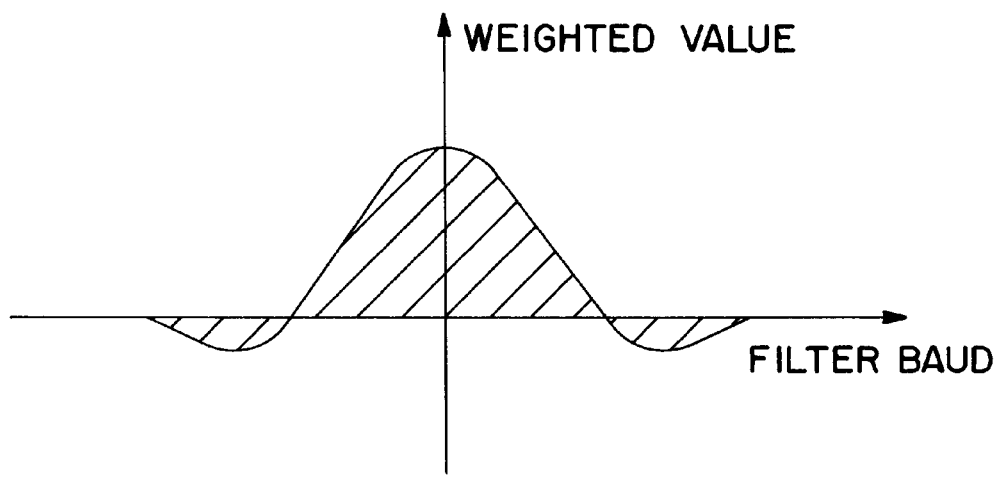
FIG. 2 shows a weighted-value distribution chart of a laser band detecting filter along a vertical coordinate according to the conventional method.

The preferred embodiment of the present invention will now be described in detail with reference to the accompanying drawings.

Throughout the drawings, like reference numerals and nomenclature are used for designation of like or equivalent parts or portions for simplicity of illustration and explanation, a detailed description of which will be omitted.

Figure 3:
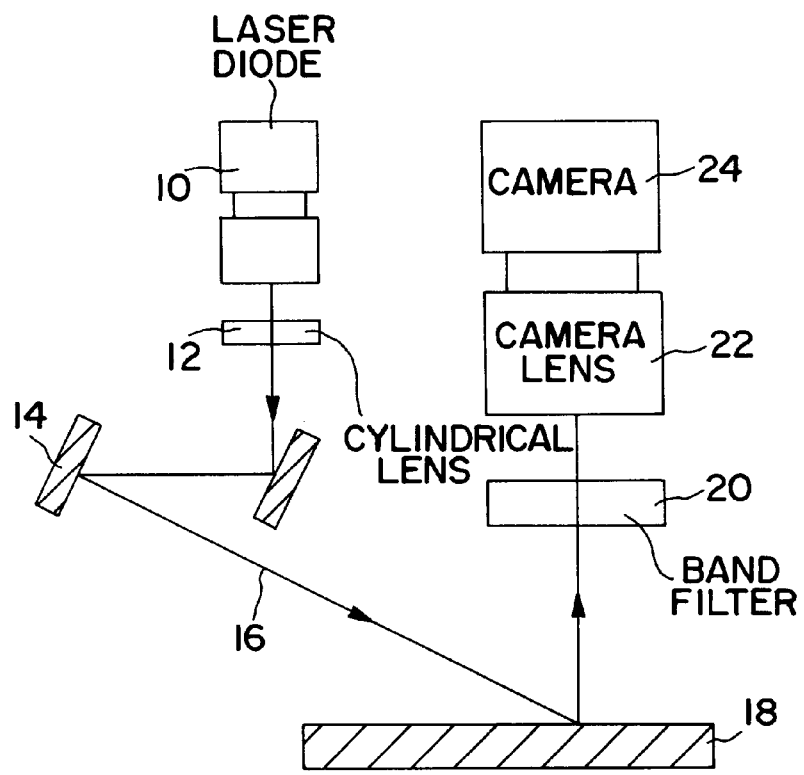
FIG. 3 is a block diagram showing a vision sensor used in a vision processing method according to an embodiment of the present invention.

FIG. 3 is a block diagram showing a vision sensor used in a vision processing method according to an embodiment of the present invention. The vision sensor includes a laser diode 10 emitting a laser beam, a cylindrical lens 12 for making the laser beam linear, a mirror 14 for changing the path of the laser beam by reflecting it, a band filter 20 for selectively transmitting the laser beam, a camera lens 22, and a camera 24 for photographing an object 18 to be welded on which the laser beam is irradiated. The band filter 20 may be a narrow band filter.

That is, the vision sensor according to the embodiment of the present invention, which is mounted on one side of a welding torch to pick up an image of a welding line, includes the camera (camcorder) 24 for viewing the object through the band filter 20 to selectively transmit a wavelength corresponding to that of the laser beam when the linearized laser beam 16 is irradiated by the torch (not shown) on the object to be welded, the linearized laser beam being about 10–50 mm in size, and through the camera lens 22.

Figure 4:
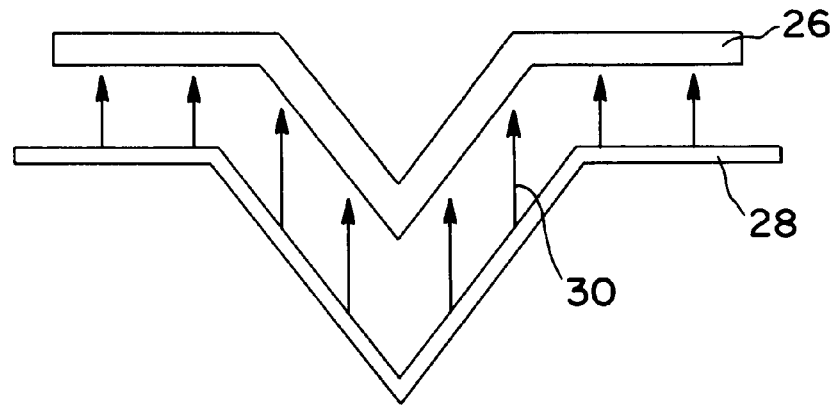
FIG. 4 shows an elastic contour model according to the embodiment of the present invention.

The vision processing method according to the embodiment of the present invention allows for the filtering of noises from the laser band on the image obtained by the vision sensor. As shown in FIG. 4, shape-memory elastic contour 28 is capable of displacement of its position and change of its shape. The elastic contour 28 is modified in its shape and position by an action force. The action force is applied to the elastic contour 28 to thereby displace the elastic contour 28 to a bright area where the laser band is positioned thereon. The elastic contour 28 is ultimately designed to approach a stable state in which the image of the laser band coincides with it. The laser band can be filtered from any image noises only when the stable state thereto is approached.

Figure 5A:
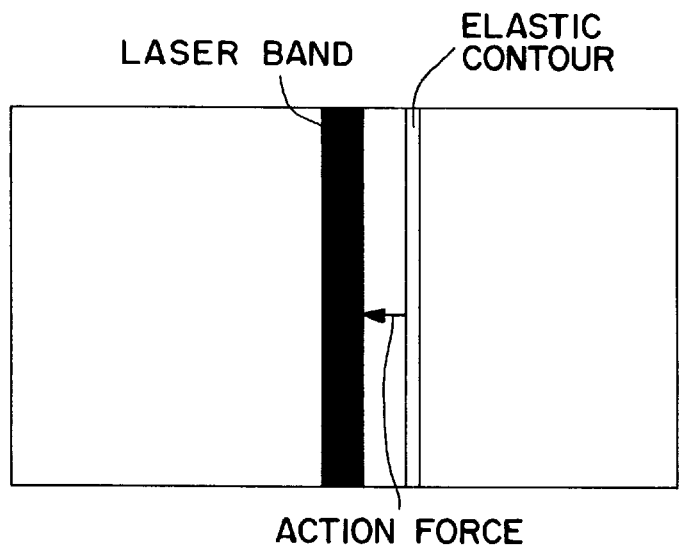
FIG. 5A shows a elastic contour positioned in the vicinity of a laser band according to the embodiment of the present invention.
Figure 5B:
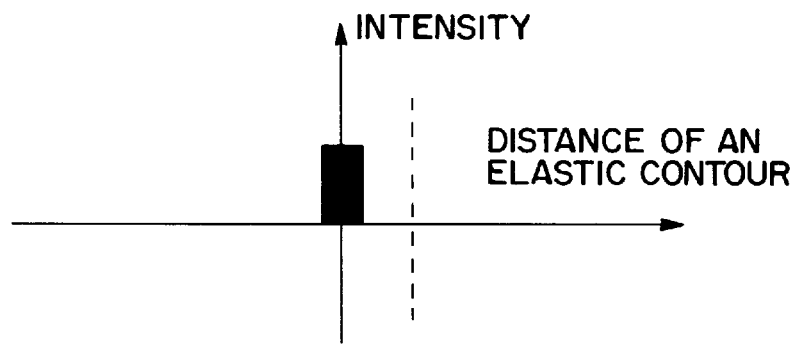
FIG. 5B shows image information about a laser band having a light and shade distribution.
Figure 5C:
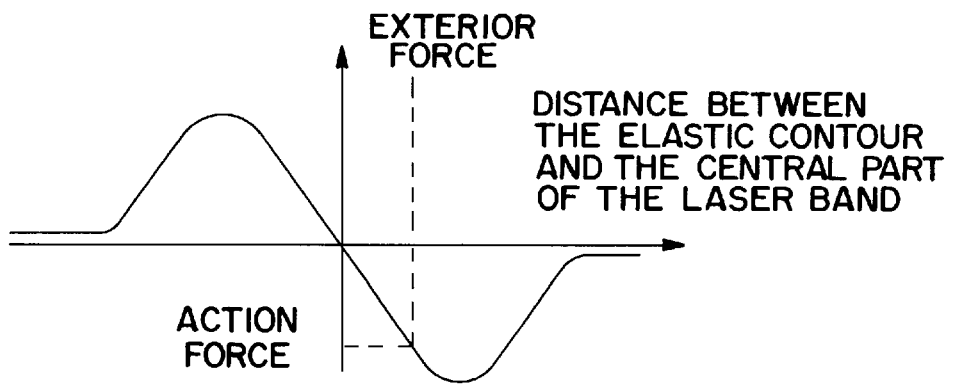
FIG. 5C shows a displacement of an elastic contour according to an action force.

As shown in FIGS. 4 and 5A, an exterior action force 30 allows the elastic contour 28 to move toward the central part of the laser band 26 on the image object. The elastic contour 28 positioned in the vicinity of the laser band, as shown in FIG. 5A, receives the same force as the intensity indicated in FIG. 5C in response to the distance between the elastic contour 28 and the central part of the laser band 26 to thereby move toward the central part of the laser band 26. Generally, the action force is obtained by analyzing the image information about the light and shade distribution of the laser band, as shown in FIG. 5B, through a computer.

That is, the action force is zero in its intensity when the elastic contour 28 coincides with the central part of the laser band in its position. The action force increases in its power to move toward the central part of the laser band 26 as the elastic contour 28 becomes more distant from the central part, and decreases in its power to move toward the central part as the elastic contour 28 becomes much more distant (more distant than a predetermined value).

Figure 6:
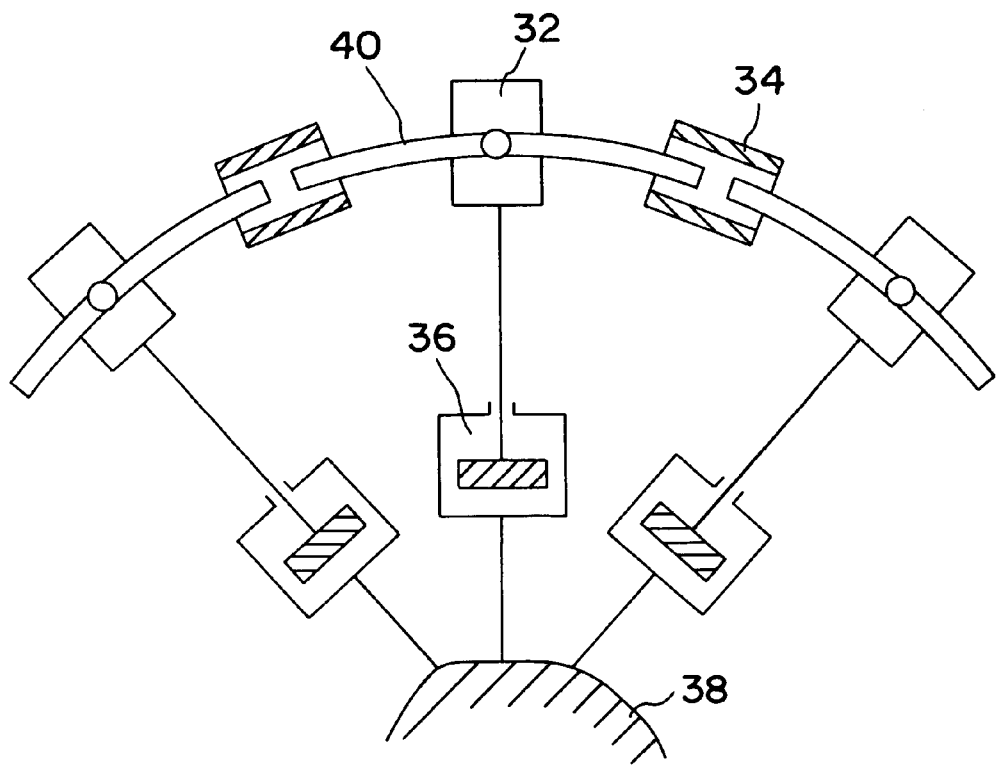
FIG. 6 shows a concept of an elastic contour according to the present invention.

The elastic contour 28 shown in FIG. 4 is explained by the concept of a mechanical system such as that shown in FIG. 6. Reference numeral 38, as shown in FIG. 6, represents a rigid body indicating the original shape of the elastic contour. The elastic contour 38 maintains its original shape when any exterior forces are not applied to the system, and the elastic contour 38 maintains its stable state when an elastic load 40 is bound by a non-frictional slider 34 due to any applied exterior forces so that the elastic load 40 and the elastic contour 38 become equal in their repulsive force.

In other words, the shape-memory elastic-contour model of the present invention is constructed such that the elastic contour 38 includes a rigid body indicating an original shape of the elastic contour; an elastic load 40 displaced with respect to the rigid body 38; a non-frictional slider 34 interfering with the movement of the elastic load 40; and an oil-damper 36 for connecting the rigid body 38 to the center of mass 32 of the elastic load.

Now, the operation of the process of the present invention thus constructed will be described.

According to the embodiment of the present invention, to filter the laser band from noises generated during the welding when an image of the laser band is formed by the vision sensor, a computer initializes the shape-memory elastic contour, which has the concept such as that of FIG. 6. The initial stage includes the steps of: forming approximately an original shape model for the elastic contour on the basis of a profile image of an object to be welded which is projected on a CCD camera; and locating the original shape model on a position where the laser band is expected to occupy.

Elasticity is generated in the laser band when a weldment deforms due to welding heat during welding, or when a welding torch misses the welding line due to any errors caused by the weldment's position. Then, the elastic contour is deformed, or, dragged to move toward the laser band by an exterior force. When the exterior force and deformation resistance of the elastic contour maintain the balance of power therebetween, the elastic contour stops its movement, thereby allowing a user to obtain the information about a profile of a welding zone from such a stable elastic contour.

The elastic contour which gets to the stable state in the former stage of the welding-joint is established as an early elastic contour of the next stage. Following the establishment, the data of the profile of the welding joint is repeatedly analyzed in the photographed laser band. Next, the data of the joint profile which is obtained from every sampling for a profile is fitted to a plurality of lines which result in intersecting points therebetween, thereby allowing a correct position of the welding line for the welding torch to be determined by utilizing the intersecting points.

The image information about the welding line which is obtained through the aforementioned process is transferred to the control system of the welding torch. As a result, the welding torch accurately moves along the welding line.

As is apparent from the foregoing, there is an advantage in the vision processing method according to the present invention in that the method causes the filtering out of noises such as spattering, arc light and the like, to improve the welding condition, so that an automatic welding process is performed even in an arc welding process in which high power is required.

Many changes, modifications, variations, and other uses and applications of the subject invention will, however, become apparent to those skilled in the art after considering the specification and the accompanying drawings which disclose a preferred embodiment. All such changes, modifications, variations, and other uses and applications which do not depart from the spirit and scope of the invention are deemed to be covered by the invention which is limited only by the claims which follow.

What is claimed is:

1. A vision processing method, comprising the steps of:
    forming a shape-memory elastic contour model having a tendency to maintain an original shape, the shape-memory elastic contour model changing shape and position based upon an exterior operation;
    giving an outline of the shape-memory elastic contour model based upon an image of an object which has been photographed;
    displacing the outlined contour model to an area to be expected to be occupied by the image of the photographed object;
    modifying the shape-memory elastic contour model in response to an exterior force, wherein the exterior force is generated in the image of the photographed object; and determining an image coordinate of the photographed object based upon the modified model.

2. The vision processing method as claimed in claim 1, wherein the shape-memory elastic-contour model comprises:

a rigid body indicative of the original shape of the shape-memory elastic contour model;

an elastic load displaced with respect to the rigid body;

a non-frictional slider interfering with the movement of the elastic load; and an oil-damper to connect the rigid body to a center of mass of the elastic load.

3. The vision processing method as claimed in claim 1, wherein the step of displacing the outlined contour model comprises the step of displacing the outlined contour model to a bright area where a laser band of the image of the object is positioned.

4. The vision processing method as claimed in claim 1, wherein the step of displacing the outlined contour model comprises the step of generating an action force to move the outlined contour model toward a central part of a laser band of the image of the object.

5. The vision processing method as claimed in claim 4, wherein the step of displacing the outlined contour model comprises the step of stopping movement of the outlined contour model when the action force is equal to a deformation resistance of the outlined contour model.

6. The vision processing method as claimed in claim 4, wherein the step of generating an action force comprises the step of analyzing information of the image of the object indicative of light and shad distribution of the laser band.

7. The vision processing method as claimed in claim 6, wherein the step of generating an action force further comprises the step of increasing the action force to move the outlined contour model toward the central part of the laser band as the outlined elastic contour model becomes more distant from the central part, and decreasing the action force to move the outlined contour model toward the central part of the laser band as the outlined elastic contour model becomes more distant than a predetermined value from the central part.

8. The vision processing method as claimed in claim 7, wherein the step of forming a shape-memory contour model comprises the steps of:

determining a profile image of the object; and approximately forming the original shape for the shape-memory elastic contour model based on the profile image.

9. The vision processing method as claimed in claim 6, wherein the step of forming a shape-memory contour model comprises the steps of:

determining a profile image of the object; and approximately forming the original shape for the shape-memory elastic contour model based on the profile image.

10. The vision processing method as claimed in claim 4, wherein the step of generating an action force comprises the step of increasing the action force to move the outlined contour model toward the central part of the laser band as the outlined elastic contour model becomes more distant from the central part, and decreasing the action force to move the outlined contour model toward the central part of the laser band as the outlined elastic contour model becomes more distant than a predetermined value from the central part.

11. The vision processing method as claimed in claim 4, wherein the step of forming a shape-memory contour model comprises the steps of:

determining a profile image of the object; and approximately forming the original shape for the shape-memory elastic contour model based on the profile image.

12. The vision processing method as claimed in claim 1, wherein the step of forming a shape-memory contour model comprises the steps of:

determining a profile image of the object; and approximately forming the original shape for the shape-memory elastic contour model based on the profile image.

13. The vision processing method as claimed in claim 1, wherein:

the step of displacing the outlined contour model comprises the steps of:

generating an action force to move the outlined contour model toward a central part of a laser band of the image of the object, and stopping movement of the outlined contour model when the action force is equal to a deformation resistance of the outlined contour model; and the step of determining an image coordinate comprises the steps of:

repeatedly analyzing a profile of a welding joint of the image of the object.

14. The vision processing method as claimed in claim 13, further comprising the step of fitting the joint profile, determined in the step of repeatedly analyzing a profile, to a plurality of lines which result in intersecting points, to determine a position of a welding line of the object.

15. A vision processing method to track a welding line of an object, the vision processing method comprising the steps of:

determining an image of the object;

forming a shape-memory elastic contour model based upon the image of the object;

modifying a position and a shape of the shape-memory elastic contour model based upon the image and an expected area to be occupied by the image; and determining an image coordinate of the object based upon the modified model.

16. The vision processing method as claimed in claim 15, wherein said step of determining an image comprises the steps of:

repeatedly analyzing a profile of a welding joint, to form a joint profile; and fitting the joint profile to a plurality of lines which result in intersecting points, to determine a position of the welding line of the object.

17. A vision sensor comprising:

a laser diode to emit a laser beam;

a cylindrical lens to make the laser beam linear;

a mirror to reflect the linear laser beam toward a weldment;

a band filter to selectively transmit the linear laser beam reflected from the weldment; and a camera to view the weldment by receiving the linear laser beam reflected from the weldment and selectively transmitted by the wide band filter.

18. A tracking device to track a welding line of an object, comprising:

a vision sensor to form an image of the object; and a controller to form a shape-memory elastic contour model and to modify a position and shape of the shape-memory model based upon the image, and to determine an image coordinate of the object based upon the modified model.

19. The tracking device as claimed in claim 18, wherein said vision sensor comprises:

a laser diode to emit a laser beam;

a cylindrical lens to make the laser beam linear;

a mirror to reflect the linear laser beam toward the object;

a wide band filter to selectively transmit the linear laser beam reflected from the object; and a camera to view the object by receiving the linear laser beam reflected from the object and selectively transmitted by the wide band filter.

20. The tracking device as claimed in claim 19, wherein said controller repeatedly analyzes a profile of a welding joint of the object to form a joint profile, and fits the joint profile to a plurality of lines which result in intersecting points, to determine a position of the welding line of the object.

* * * * *

UNITED STATES PATENT AND TRADEMARK OFFICE
CERTIFICATE OF CORRECTION

PATENT NO.:     6,049,059
DATED     :     April 11, 2000
INVENTOR(S):    Jae-Sun KIM It is certified that [an/error[s]] appears in the above-identified patent and that said Letters Patent is hereby corrected as shown below:

Column 5, Line 31, change "shad" to -- shade--.

Signed and Sealed this

Twentieth Day of March, 2001

*Attest:*

NICHOLAS P. GODICI

*Attesting Officer*   Acting Director of the United States Patent and Trademark Office